W. T. CHILDS.

CUTTING MACHINE.

APPLICATION FILED AUG. 17, 1916.

Reissued Oct. 31, 1916.

14,210.

3 SHEETS—SHEET 1.

Inventor

Wilbur T. Childs

By C. E. Humphrey

Attorney

THE NORRIS PETERS CO., PHOTO-LITHO., WASHINGTON, D. C.

W. T. CHILDS.

CUTTING MACHINE.

APPLICATION FILED AUG. 17, 1916.

Reissued Oct. 31, 1916.

14,210.

3 SHEETS—SHEET 2.

Inventor
Wilbur T. Childs,

By C. E. Humphrey
Attorney

THE NORRIS PETERS CO., PHOTO-LITHO., WASHINGTON, D. C.

W. T. CHILDS.

CUTTING MACHINE.

APPLICATION FILED AUG. 17, 1916.

Reissued Oct. 31, 1916.

14,210.

3 SHEETS—SHEET 3.

Inventor

Wilbur T. Childs

By C. E. Humphrey

Attorney

THE NORRIS PETERS CO., PHOTO-LITHO., WASHINGTON, D. C.

UNITED STATES PATENT OFFICE.

WILBUR T. CHILDS, OF AKRON, OHIO, ASSIGNOR TO ALEXANDRE CHATELAIN, OF AKRON, OHIO.

CUTTING-MACHINE.

14,210. Specification of Reissued Letters Patent. Reissued Oct. 31, 1916.

Original No. 1,188,732, dated June 27, 1916, Serial No. 52,497, filed September 24, 1915. Application for reissue filed August 17, 1916. Serial No. 115,546.

*To all whom it may concern:*

Be it known that I, WILBUR T. CHILDS, a resident of Akron, in the county of Summit and State of Ohio, have invented certain new and useful Improvements in Cutting-Machines, of which the following is a specification.

This invention relates to cutting machines, capable of being used by butchers or meat cutters, although its use is not thereby limited.

An object of the invention is to provide a cutting machine adapted to be manually held and directed and which is provided with a plurality of cutting tools arranged for simultaneous movement in opposite directions, there being means provided for moving these tools simultaneously in opposite directions. The tools are supported in a frame and power may be applied to the tools through a flexible shaft connection or by other suitable means.

With the above object in view the machine includes a U-shaped frame provided at one end with a handle and having shafts journaled in its opposite end portions. Means are provided in the intermediate portions of the frame for rotating the shafts simultaneously and alternately in the same direction, and tool holders are mounted in the end portions of the frame which are adapted to be reciprocated by said shaft. The tools are held by the holders in close proximity to each other and when the machine is held in position for use the tools operate in the plane in which the machine is directed.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
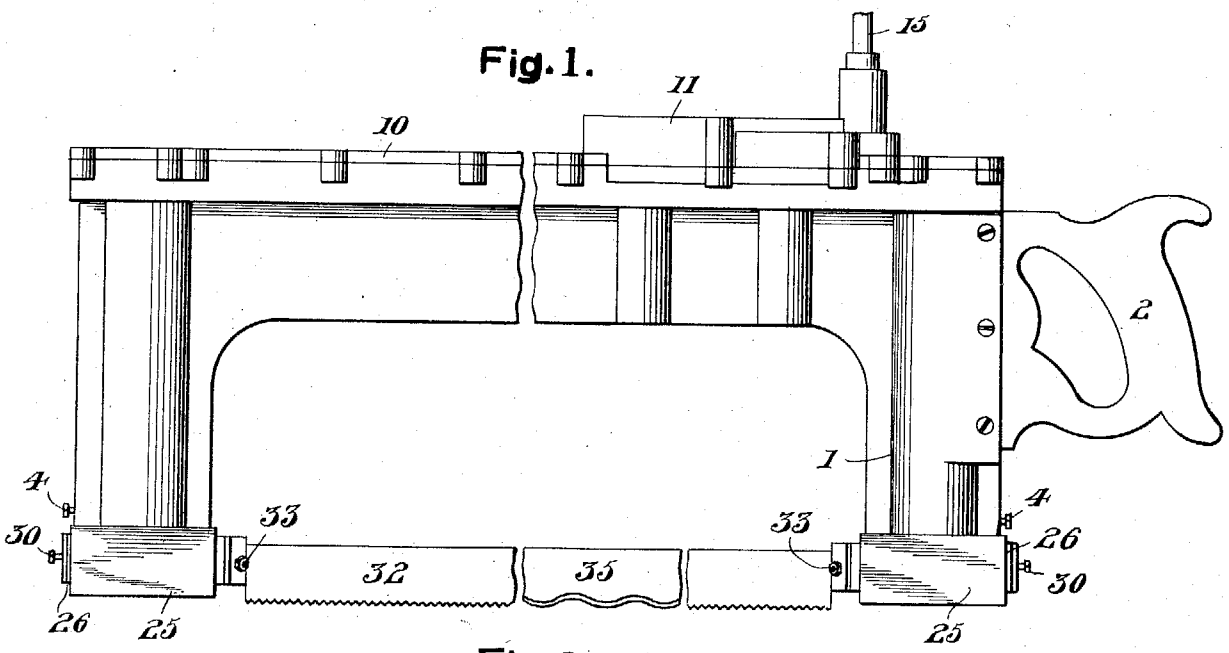
Figure 2:
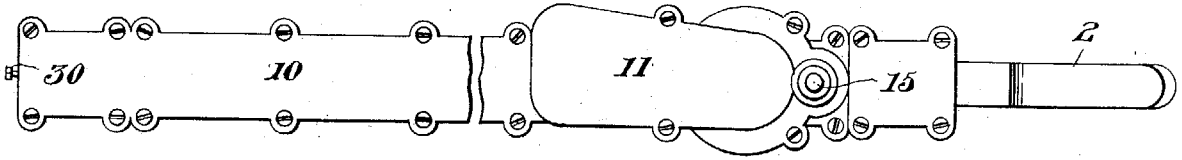
Figure 3:
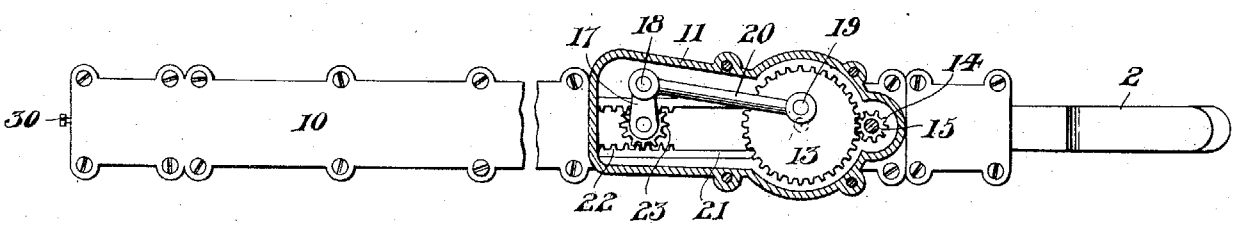
Figure 4:
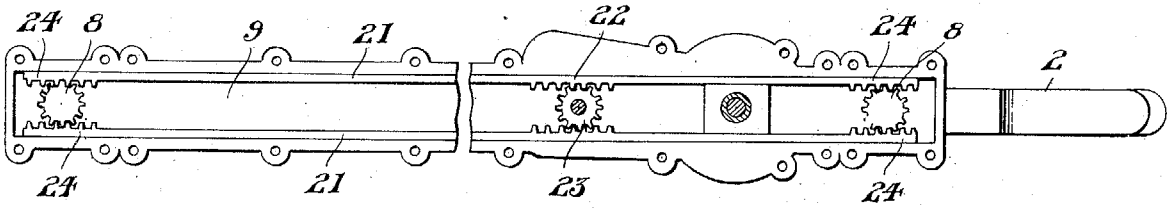
Figure 5:
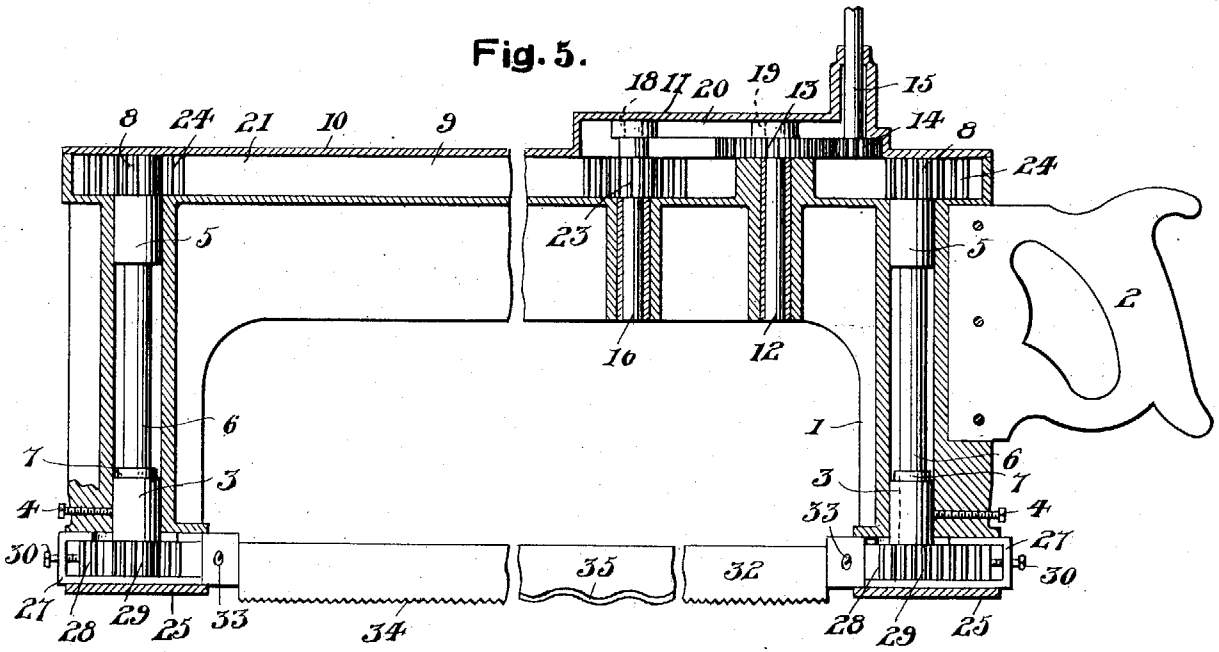
Figure 6:
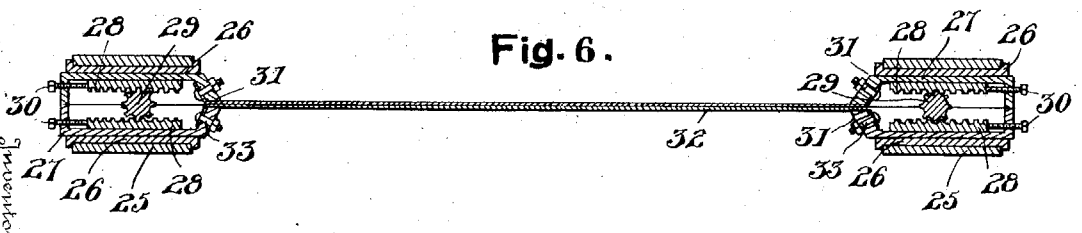

In the drawings in which similar reference numerals indicate like parts in the different figures, Figure 1 is a side elevation of a device embodying this invention, Fig. 2 is a plan view. Fig. 3 is a top plan view with the upper portion of the frame in horizontal section. Fig. 4 is a plan view with the cover or top plate removed. Fig. 5 is a vertical, longitudinal, central, sectional view of the device. Fig. 6 is a horizontal sectional view of the device taken through the cutting tools.

The device comprises a frame 1 which is substantially U-shaped in side elevation and which is provided at one end with a handle 2. The end portions of the frame 1 are hollow and contain lower bearings secured therein by means of set screws 4. Mounted in each end of the frame and in vertical alinement with each bearing 3 is a bearing 5. Mounted in each pair of these alined bearings 3 and 5 is a rotatable shaft 6. The shafts 6 are provided near their lower ends with shoulders 7 which rest upon the bearings 3. A gear 8 is mounted upon the upper end of each of the shafts 6 and these gears are positioned in a channel 9 which comprises a bottom, side and end walls and is situated in the upper intermediate portion of the frame 1. A plate 10 forms the upper wall or cover of the channel 9 and is secured in position by means of suitable securing devices. The plate or cover 10 is provided with an upwardly-projecting offset portion 11, preferably formed integrally therewith and having a bearing. A vertical stub shaft 12 is journaled in the upper, intermediate portion of the frame 1 and carries a gear 13 which meshes with a gear 14 on the lower end of a stub shaft 15 journaled in the bearing in the offset 11. A flexible shaft (not shown) may connect the stub shaft 15 with a source of power whereby the said stub shaft is rotated. A vertical rotatable stub shaft 16 is journaled in the upper intermediate portion of the frame 1 and carries near its upper end an arm 17 which is located within the offset 11, and said arm carries a pin 18 near its outer end. A pin 19 is eccentrically positioned within the upper face of the gear 13. The center of the pin 19 is nearer the axis of the stub shaft 12 than the center of the pin 18 is with respect to the axis of the shaft 16. A connecting rod 20 pivotally connects the pins 18 and 19. Consequently as the gear 13 is rotated, one end of the rod 20 moves orbitally about the axis of the shaft 12 while the other end of the rod 20 rocks or oscillates back and forth partially around the axis of the shaft 16.

Along each side wall of the channel 9 is slidably mounted a bar 21. The bars 21 are provided with rack teeth 22 which mesh with a gear 23 on the upper end of the stub shaft 16. Consequently as the stub shaft 16 is alternately partially rotated by the action of the rod 20, as hereinbefore described, the bars 21 are reciprocated back and forth simultaneously in opposite directions. The bars 21 are provided near their ends with rack teeth 24 which mesh with the teeth of the gear 8 mounted at the upper ends of each of the shafts 6. Hence it will be seen that as the bars 21 reciprocate as above described, the shafts 6 are partially rotated simultaneously in the same direction. Guides 25 open at both ends are provided at the lower extremities of the ends of the frame 1 and are in horizontal and longitudinal alinement with each other. Bearing strips 26 are located in the guides 25 at the open sides thereof and tool holders 27 are slidably mounted in the guides 25 and their outer surfaces contact with the bearing strips 26. Plates 28 are located within the tool holders 27 and are provided with rack teeth to mesh with the teeth of the gears 29, each of which is fixed to the lower end of each shaft 6. Adjusting screws 30 pass through suitably fashioned openings in the outer ends of the tool holders 27 and engage the adjacent ends of the plates 28 whereby the positions of the tool holders are controlled. A pair of holders is located in each of the guides 25. The inner ends of the members of each pair of tool holders in each guide 25 are inclined inwardly and toward each other to provide a wall 31, to which cutting tools 32 are secured by holding means, which permit the bent end portions of the cutting tools 32 to lie against the inner surfaces of the inclined end walls of said holders. The ends of each tool 32 are secured to alined holding members 27 in each guide, hence when two tools are employed the cutting tools lie in close proximity or in approximate contact with each other. The cutting tools 32 may be provided with saw teeth 34 or cutting edges 35 or each tool may have a portion of its edge provided with a series of saw teeth and another portion with a cutting edge.

It will be apparent that as the shafts 6 are partially rotated simultaneously in the same direction the gears 29 carried at the lower ends thereof and intermeshing with the rack teeth on the plates 28 they move the holders 27 connected with each tool alternately in opposite directions; the cutting tools 32 which are carried by the holders 27 are simultaneously reciprocated in opposite directions. By reason of the fact that the cutting tools 32 are moved by the pulling strain exerted upon them through the shafts 6 and the holders 27 the screws 30 may be adjusted whereby the holders 27 may be adjusted to hold the tools under proper tension and transmit the pulling strain from the shafts 6 to the tools 32. Furthermore, the adjusting screws may be turned to compensate for any expansion or contraction of either tool 32 and thus hold them under sufficient tension and in true planes to enable them to function in a regular and even manner, and by thus holding them in true planes the tools will uniformly operate in a common kerf which will be narrow and thin due to the proximity of the tools 32 to each other.

From the above description taken in conjunction with the accompanying drawings, it will be seen that a cutting device of simple and durable structure is provided.

Having described the invention, what I claim is,

1. A meat and bone cutting machine comprising a frame, blade holders movably mounted in the frame and arranged in pairs and located one pair at each end of the frame, blades secured at their opposite ends to the corresponding members of the pairs of blade holders, said blades arranged in sliding contact with each other and means mounted upon the frame for reciprocating the members of the pairs of blade holders at the opposite ends of the frame simultaneously in opposite directions, said blade holders of each pair engaging the same blade being independent of each other thereby putting tension on each blade during its reciprocation.

2. A meat and bone cutting machine comprising a frame, blade holders movably mounted therein, blades connected with the blade holders and movable therewith, rack plates movably mounted in the blade holders, means for adjusting the rack plates in the blade holders, shafts journaled in the frame, gear wheels carried by the shafts and meshing with the teeth of the rack plates and means mounted upon the frame for turning the shafts simultaneously in the same direction whereby the rack plates and blade holders are reciprocated, said blade holders of each pair engaging the same blade being independent of each pair thereby putting tension on each blade during its reciprocation.

3. A meat and bone cutting machine comprising a frame, blade holders movably mounted upon the frame, blades connected with the blade holders and movable therewith, shafts journaled upon the frame and operatively connected with the blade holders, rack bars movably mounted upon the frame for oscillating the shafts simultaneously a stub shaft journaled upon the frame, a gear wheel carried by the stub shaft and engaging the bars, an arm mounted upon the stub shaft and having an upstanding pin, a second stub journaled upon the frame, means for rotating the second mentioned stub shaft, an eccentrically positioned pin carried by the second mentioned stub shaft, the last mentioned pin being nearer the axis of the second mentioned stub shaft than the first mentioned pin from the axis of the first mentioned stub shaft, and a link loosely mounted on both of said pins.

4. A cutting device comprising a frame, tool holders movably mounted in the frame and arranged in pairs one member of each pair located at each end of the frame, tools secured at their ends to the opposite members of each pair of holders, said tools arranged in sliding contact with each other, and means for reciprocating the members of each pair of tool holders at the opposite ends of the frame simultaneously in opposite directions, said tool-holders of each pair engaging the same blade being independent of each other thereby putting tension on each tool during its reciprocation.

5. A cutting device comprising a frame, tool holders movably mounted therein, tools connected with said holders and movable therewith, plates having rack teeth coöperating with said holders, means for adjusting the position of said holders with respect to said plates, shafts journaled in the frame, gears carried by the shafts and meshing with the teeth on said plates, and means for simultaneously, partially rotating the shafts in the same direction, whereby the plates and blade holders are reciprocated.

6. A cutting device comprising a frame, tool holders movably mounted upon the frame, tools connected with said holders and movable therewith, shafts journaled in the frame and operatively connected with said holders, bars having rack teeth movably mounted in the frame for partially rotating the shafts simultaneously, a stub shaft journaled in the frame, a gear carried by said stub shaft and engaging the teeth on said bars, an arm mounted on the stub shaft, a pin on arm, a second stub shaft journaled in the frame, means for rotating the last mentioned shaft, an eccentrically positioned pin carried by the last mentioned shaft, the last mentioned pin being nearer the axis of its supporting shaft than the first mentioned pin from the axis of its supporting shaft, and a link loosely connecting said pins.

7. A cutting device comprising a U-shaped frame, a pair of tool holders slidably mounted at each end of said frame, the members of each pair of tool holders on one end being in alinement with and independent of a corresponding member on the opposite end of said frame, a cutting tool extending between the alined members of each pair of holders, said tools arranged in sliding contact and means for simultaneously reciprocating said tool-holders in opposite directions.

8. A cutting device comprising a U-shaped frame, a pair of tool holders slidably mounted at each end thereof each member of each pair being in alinement with a corresponding member of the other pair, cutting tools extending between corresponding members of the two pairs and arranged in sliding contact, means for moving the independent members of each pair of said tool holders toward or away from each other, said holders arranged during their reciprocation to bring a strain directly on said tools and means for simultaneously reciprocating said tools in opposite directions.

In testimony whereof, I have hereunto set my hand, this seventh day of August, 1916, at Akron, Ohio.

WILBUR T. CHILDS.

Copies of this patent may be obtained for five cents each, by addressing the "Commissioner of Patents, Washington, D. C."